Dec. 20, 1938.  C. L. BROWN  2,140,687
TRACTOR DRIVE TAKE-OFF
Filed Feb. 4, 1938  2 Sheets-Sheet 1

Inventor
C. L. Brown
By L. B. James
Attorney

Dec. 20, 1938.  C. L. BROWN  2,140,687
TRACTOR DRIVE TAKE-OFF
Filed Feb. 4, 1938  2 Sheets-Sheet 2

Inventor
C. L. Brown
L. B. James
Attorney

UNITED STATES PATENT OFFICE 2,140,687

TRACTOR DRIVE TAKE-OFF

Charley L. Brown, Rushville, Mo., assignor of one-half to Claude W. McQueen, Rushville, Mo.

Application February 4, 1938, Serial No. 188,768

2 Claims. (Cl. 74—11)

This invention relates to tractors, the general object of the invention being to provide means for driving a take-off shaft from the crank shaft, independently of the transmission shaft, so that the engine can be used to drive other machinery, through the take-off shaft, while the tractor is standing still and the transmission means are idle.

The invention also consists in certain other features of construction, combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1:
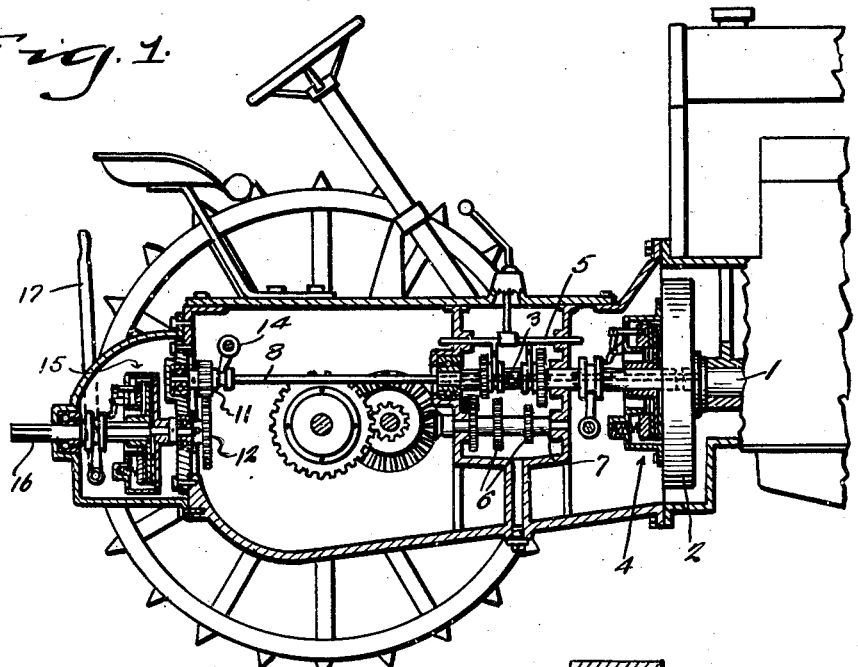
Fig. 1 is a vertical sectional view through parts of a tractor, constructed in accordance with this invention.
Figure 2:
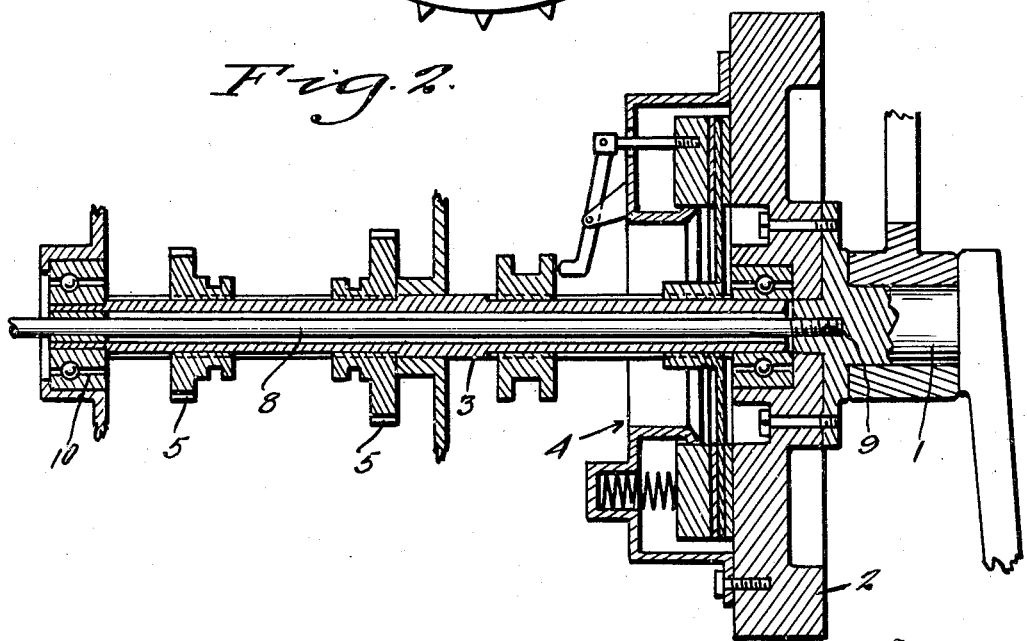
Fig. 2 is an enlarged sectional view through the transmission means of the tractor, with parts omitted.
Figure 3:
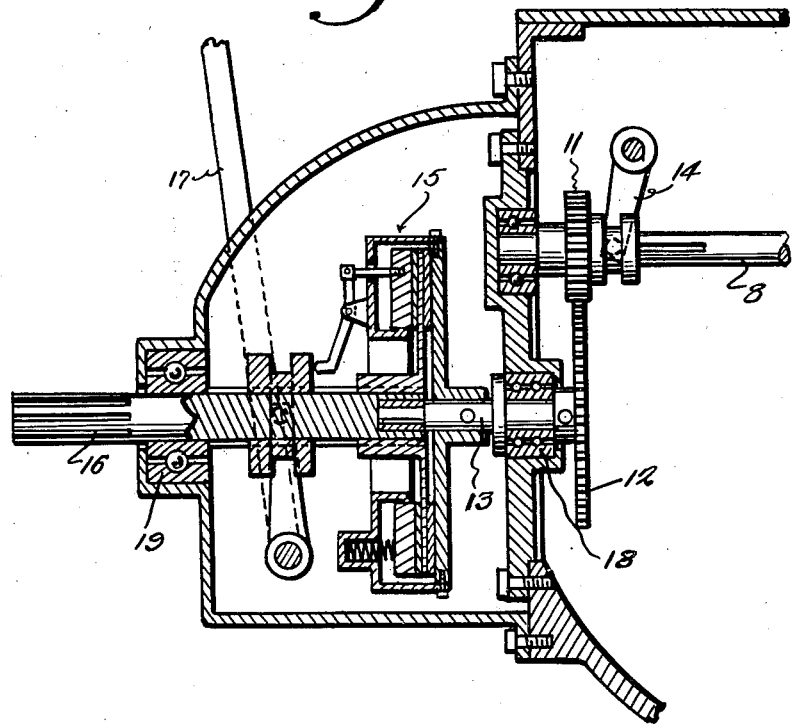
Fig. 3 is an enlarged sectional view through the rear part of Fig. 1 to show the clutch means which connect the take-off shaft with the auxiliary shaft.

In these drawings, the numeral 1 indicates the crank shaft of the engine of the tractor, the numeral 2, the fly wheel thereof and the numeral 3 indicates the transmission shaft which is adapted to be connected to the fly wheel by the usual clutch means shown generally at 4. The gears on this shaft are shown at 5 and are adapted to be moved into and out of mesh with the gears 6 on the countershaft 7 of the transmission means, in the usual or any desired manner. Of course the countershaft is connected in the usual manner to the drive means for the wheels of the tractor.

In carrying out my invention, I make the transmission shaft 3 hollow to receive an auxiliary shaft 8 which has its front end suitably connected to the rear end of the crank shaft, such as being threaded in a socket in the crank shaft, as shown at 9. Any number of bearings 10 may be provided for this shaft 8. A gear 11 is keyed to the rear end of the shaft 8 and is moved into and out of mesh with a gear 12 on a shaft 13 by a clutch arm 14 operated by a lever or the like. Suitable clutch means, shown generally at 15 connect the shaft 13 with the take-off shaft 16, the clutch means being actuated by a lever 17. Bearings 18 and 19 are provided for the shafts 13 and 16.

Thus it will be seen that when the transmission means of the tractor are idle, due to the clutch means being in released position, the shaft 8 will be rotating from the engine and if the clutch means 14 and 15 are engaged, the said shaft 8 will rotate the take-off shaft 16.

Figure 4:
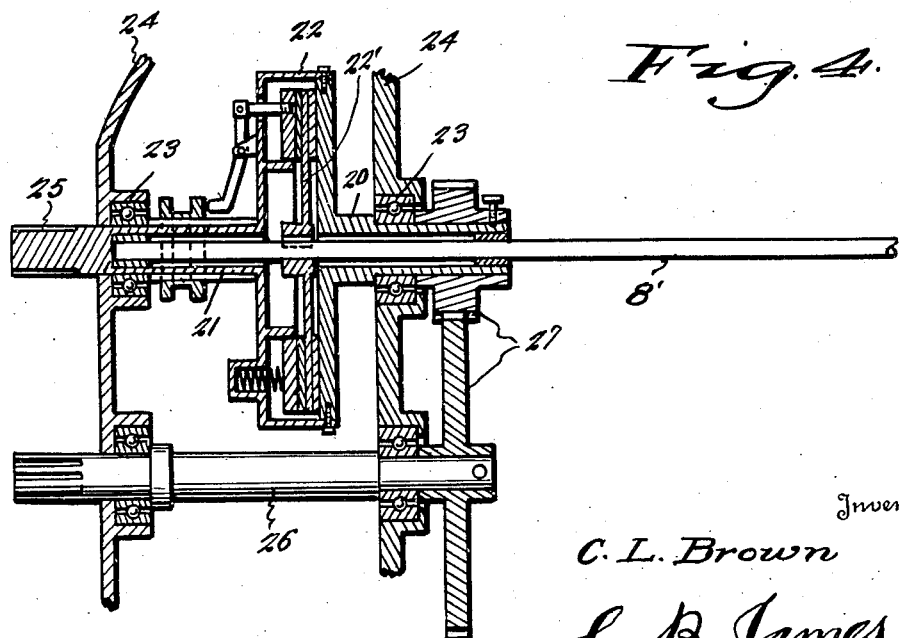
Fig. 4 is a sectional view showing a modification.

In the modification shown in Fig. 4 the shaft 8' passes through the hollow clutch shafts 20 and 21 which are adapted to be connected together and to the shaft 8' by the clutch means shown generally at 22, the disk 22' of which is attached to shaft 8'. These shafts 20 and 21 are supported by the bearings 23 in the housing parts 24 and the shaft 21 is extended through the housing and forms a take-off shaft 25. A second take-off shaft 26 is journaled in the housing and has one end projecting therefrom and this shaft is connected to the shaft 8' by the gears 27. Thus when the shaft 8' is rotating both shafts 21 and 26 can be rotated by engaging the clutch 22.

It is thought from the foregoing description that the advantages and novel features of the invention will be readily apparent.

It is to be understood that changes may be made in the construction, combination and arrangement of the several parts, provided such changes fall within the scope of the appended claims.

What I claim and desire to protect by Letters Patent is:

1. In a motor vehicle including a motor shaft and transmission means, a hollow shaft for such means, a second shaft passing through the hollow shaft and connected with the motor shaft, a take-off shaft, a stub shaft, gears connecting the stub shaft to the second shaft, clutch means for connecting the stub shaft to the take-off shaft, and means for moving one gear into and out of mesh with the other gear.

2. In a motor vehicle including a motor shaft, and transmission means having a rotatably mounted tubular shaft alined with the motor shaft and clutch means for effecting turning of the tubular shaft with said motor shaft; an auxiliary shaft extending longitudinally through said tubular shaft and having one end in threaded engagement with the motor shaft, said auxiliary shaft being rotatable in the tubular shaft and having its rear portion projecting from the tubular shaft, a support for the rear end of said auxiliary shaft, a casing carried by said support at the opposite side thereof from the auxiliary shaft, a take-off shaft rotatably mounted in said casing with one end projecting out of the casing, a stub shaft journaled through said support in alinement with said take-off shaft and having its inner end rotatably engaged with the inner end of the take-off shaft, companion gears carried by the outer end of said stub shaft and the rear end portion of said auxiliary shaft, one gear being shiftable along the shaft carrying the same into and out of mesh with the companion gear, and a clutch in said casing for selectively establishing connection between the stub shaft and the take-off shaft.

CHARLEY L. BROWN.